United States Patent [19]

Campana

[11] 4,299,661
[45] Nov. 10, 1981

[54] MONITORING ARRANGEMENT FOR VENTED NUCLEAR FUEL ELEMENTS

[75] Inventor: Robert J. Campana, Solana Beach, Calif.

[73] Assignee: The United States of America as represented by the United States Department of Energy, Washington, D.C.

[21] Appl. No.: 930,718

[22] Filed: Aug. 3, 1978

[51] Int. Cl.² ............................................. G21C 3/16
[52] U.S. Cl. .................................. 376/251; 376/363; 376/456
[58] Field of Search .................... 176/37, 38, 60, 78, 176/19 R, 19 LD

[56] References Cited

U.S. PATENT DOCUMENTS

| | | | |
|---|---|---|---|
| 3,010,889 | 11/1961 | Fortescue et al. | 176/19 R |
| 3,049,487 | 8/1962 | Harrier et al. | 176/78 |
| 3,206,369 | 9/1965 | Fortescue et al. | 176/78 |
| 3,252,869 | 5/1966 | Koutz | 176/37 |
| 3,432,388 | 3/1969 | Fortescue | 176/78 |
| 3,743,576 | 7/1973 | Fortescue | 176/78 |
| 3,928,129 | 12/1975 | Goetzmann | 176/38 |
| 4,077,839 | 3/1978 | Peehs et al. | 176/78 |

Primary Examiner—S. A. Cangialosi

[57] ABSTRACT

In a nuclear fuel reactor core, fuel elements are arranged in a closely packed hexagonal configuration, each fuel element having diametrically opposed vents permitting 180° rotation of the fuel elements to counteract bowing. A grid plate engages the fuel elements and forms passages for communicating sets of three, four or six individual vents with respective monitor lines in order to communicate vented radioactive gases from the fuel elements to suitable monitor means in a manner readily permitting detection of leakage in individual fuel elements.

6 Claims, 9 Drawing Figures

MONITORING ARRANGEMENT FOR VENTED NUCLEAR FUEL ELEMENTS

BACKGROUND OF THE INVENTION

The present invention relates to a monitoring arrangement for vented nuclear fuel elements and more particularly to such a monitoring arrangement in combination with an array of fuel elements in a gas-cooled fast nuclear reactor.

In nuclear reactors of the type contemplated by the present invention, solid nuclear fuel is commonly protected and/or contained by cladding formed from a suitable material, such as metal, which effectively separates the solid nuclear fuel from coolant which is circulated through the reactor core to extract heat from the fuel elements. The cladding thus tends to prevent contamination of the coolant by the nuclear fuel material as well as by fission products formed within the fuel elements during operation of the reactor.

In fast reactors of the type contemplated by the present invention, high pressure coolant is required to extract heat efficiently. Pressure equalization is employed to relieve the fuel cladding of undesirable pressure forces. Pressure equalization is accomplished by interconnecting internal gas spaces of the fuel rods within a fuel element with external coolant fluid in order to vent the substantial amounts of fission gases generated in the fuel elements. It is further desirable or necessary to prevent these fission products from entering the main coolant stream of the reactor. For this reason, fuel elements in gas-cooled fast reactors may employ vent systems wherein a small fraction of the gas coolant flow is diverted from the main coolant stream flowing externally of the fuel elements. The diverted coolant flow acts as a sweep gas and is directed past the fuel element vents to carry the fission products to suitable traps located externally of the reactor core. The fission products are retained in the traps and the diverted coolant acting as a sweep gas is returned to the main coolant stream.

The efficiency or operating condition of the individual fuel elements may be accurately assessed by analyzing or monitoring radiation from the fission product gases which are vented therefrom. Fission gases released from the solid fuel must be transported to the fuel element vents from non-leaking fuel rods and elements (where the cladding is integral) by gaseous diffusion, a very slow process at high gas pressures. Thus, during transport to the vents, radioactivity of the fission gases being vented decreases or decays to relatively low levels. On the other hand, in leaking fuel rods, the fission gases are transported to the fuel element vents by forced convection purging caused by coolant leaking into the affected fuel rods. Convection transport takes place rapidly relative to diffusion transport so that relatively limited decay of radioactivity occurs between the leaking fuel rods and the fuel element vents. Radioactivity in gases being vented from fuel elements containing leaking fuel rods is therefore much greater than in integral fuel elements which do not contain leaking fuel rods. The presence and rate of leakage for fuel rods in the respective fuel elements may thus be determined by fission products vented from the fuel elements.

Accordingly, the gases which are vented from the individual fuel elements may be monitored to provide an indication of the operating condition of the individual fuel elements. However, the core of a gas-cooled fast reactor includes a very large number of fuel elements which are closely arranged in order to achieve efficient reactor operation. Thus, it is particularly difficult to provide a monitoring arrangement for effectively monitoring effluent gases from each individual fuel element.

At the same time, the substantial radiation levels within such reactors tend to produce stresses within the individual elongated fuel elements which commonly result in the fuel elements becoming bowed. This tendency of the fuel elements to become bowed may be further increased by thermal conditions within the reactor.

Accordingly, there has been found to remain a need for gas-cooled fast reactors and the like permitting compact arrangement of large numbers of fuel elements while facilitating efficient interconnection of vents for the individual fuel elements with suitable gas monitoring means.

SUMMARY OF THE INVENTION

It is therefore an object of the invention to provide a monitoring arrangement for a closely packed hexagonal array of nuclear fuel elements in the core of a gas-cooled fast reactor or the like.

It is also an object of the invention to provide a monitoring arrangement wherein passages in communication with the individual vents for the various fuel elements are formed by a grid plate surrounding and engaging part of the various fuel elements. In this manner, passages formed within the grid plate may be in direct communication with vents on the individual fuel elements, additional passages being formed in the grid plates for interconnection with suitable monitoring lines.

It is yet another object of the invention to provide a monitoring arrangement for a large number of fuel elements in a gas-cooled fast reactor core wherein the fuel elements are arranged in a hexagonal pattern to facilitate maximum density arrangement of the fuel elements within the core. Because of the closely packed arrangement of the fuel elements, and the inherent tendency for radiation-induced bowing, each element is provided with diametrically opposed vents which are communicated with the monitoring lines. The diametrically arranged vents permit the fuel elements to be periodically rotated 180° in order to counteract bowing effects as discussed above.

With each fuel element having two vents and the fuel elements being arranged in a hexagonal configuration, each monitoring line is preferably connected with a repeating geometric arrangement of a selected plurality of three, four or six vents on the individual fuel elements. It will be apparent from the following description that these combinations of interconnections repeat geometrically throughout the core of a hexagonal arrangement of fuel elements and permit each monitor line to serve a number of vents, the number of monitor lines being less than the number of fuel elements within the reactor core.

Additional objects and advantages of the invention will be apparent from the following description having reference to the accompanying drawings.

DESCRIPTION OF THE PREFERRED EMBODIMENTS

Figure 1:
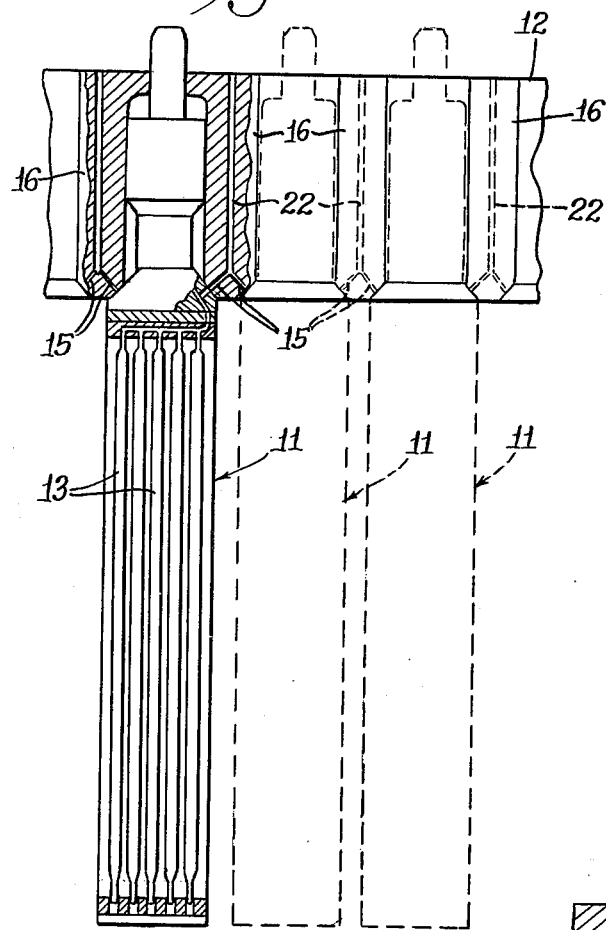
FIG. 1 is a fragmentary view of a plurality of nuclear fuel elements suspended from a supporting grid plate within the core of a gas-cooled fast nuclear reactor.

The present invention relates to a gas-cooled fast reactor which may be of generally conventional construction and operation except for the arrangement of the fuel elements within the reactor core and their interconnection with a monitoring system as is described in greater detail below.

The invention is particularly contemplated in combination with such a reactor having a plurality of fuel rods arranged within individual fuel elements, the fuel elements being suspended in cantilevered fashion from a grid plate. Such an arrangement is partially illustrated in FIG. 1 wherein fuel elements 11 are suspended from a grid plate 12. Each fuel element 11 includes a plurality of fuel rods as indicated at 13.

Within the gas-cooled fast reactor, a coolant gas such as helium is circulated about fuel rods in each of the fuel elements to remove heat generated by nuclear fission within the elements, the coolant being withdrawn from the reactor and circulated to heat exchanger means (not shown) for extracting heat from the reactor to accomplish useful work such as power generation. The coolant is commonly circulated in a single direction through the fuel elements. Within the partial representation of FIG. 1 for example, relatively high pressure coolant is present within the reactor above the grid plate 12 while the coolant is at a relatively lower pressure beneath the grid plate.

It may thus be seen that the invention is described within the embodiment of the drawings as including a large number of fuel elements suspended from a grid plate such as that indicated at 12 which is arranged toward the upper end of the fuel elements. It will of course be understood that the present invention is also applicable in reactor designs which include bottom grid plates and are adapted for upward flow of coolant through the core.

Each of the fuel elements 11 is internally constructed to permit a small portion of the coolant gas to circulate or sweep internally across the vents of the fuel elements. Fission products generated within and vented from the fuel elements as gases may thus be carried or swept toward suitable traps in order to prevent them from mingling with coolant gas throughout the reactor. Upon the occurrence of a leak in a fuel rod, coolant fluid leaks into and continuously purges the fuel rod in order to prevent fission gases from entering the coolant stream. This sweeping effect of the coolant fluid reduces transport time as discussed above and thus increases the level of radioactivity in gases vented from the fuel element.

For these reasons, in accordance with the present invention, the interior of each of the fuel elements is placed in communication with suitable traps through monitoring means for determining the operating condition of the respective fuel elements. The passages interconnecting the interior of the fuel elements with the monitoring means and traps are maintained at a relatively lower dynamic pressure than the coolant circulating about the fuel elements in order to assure that the fission products do not escape into the main coolant flow. At the same time, excessive pressures are prevented from developing across the cladding of the fuel rods within the fuel elements and any undesirable leakage of radioactivity within any fuel assembly may be readily detected and located.

Figure 2:
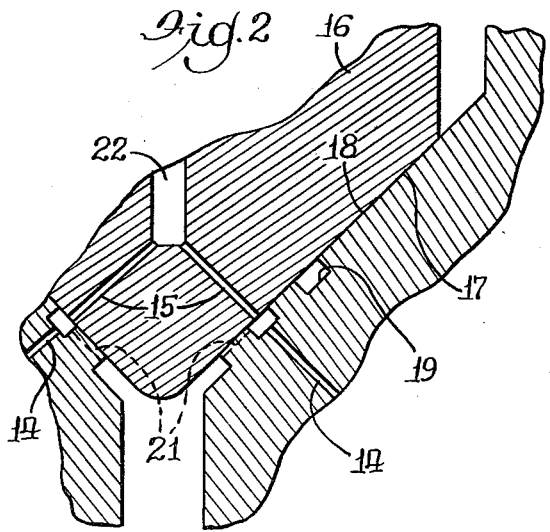
FIG. 2 is an enlarged fragmentary view taken at the bottom of a tri-cusp portion of the grid plate.

The manner in which coolant gas is communicated with the interior of the fuel elements 11 is described immediately below having reference to FIGS. 1 and 2. Initially, each fuel element 11 is formed with a pair of diametrically opposed outlet gas vents 14. The vents are placed in communication with respective passages 15 formed within the tri-cusp portions 16 of the grid plate 12. The lower end of each tri-cusp portion 16 of the grid plate is formed with tapered annular surfaces 17 which intimately mate with tapered surfaces 18 of the respective fuel elements. Abutting portions of the tapered surfaces 17 and 18 above the communicating passages 14 and 15 form a metal-to-metal contact seal. A guard ring or groove 19 is also formed on the tapered surface 18 of each fuel element to further assist in isolating the passages 14 and 15 from the relatively high pressure coolant above the grid plate.

At the same time, suction holes 21 admit sweep gas from the low pressure area beneath the grid plate into each vent 14 for the fuel element. The suction holes 21 are designed so that pressure within the passages 14 and 15 never rises to the level of the pressure beneath the grid plate. Thus, low pressure coolant may flow into the interior of each fuel element as necessary to maintain equalized static pressure therein. However, particularly when the reactor is operating at relatively high power output, resulting fission product gases also tend to be swept from the vents of the fuel elements by the low pressure coolant flow within the fuel elements and carried through the passages 14 and 15 into the grid plate for communication to the monitoring system and trap means as described in greater detail below.

The invention particularly contemplates the use of fuel elements having diametrically opposed vents 14 so that the fuel elements may be rotated 180° to counteract the effects of bowing due to radiation. The hexagonal array of the fuel elements may be best seen in FIGS. 4 and 6 from the arrangement of holes in the grid plates for receiving the respective fuel elements. With such an arrangement, the fuel elements are disposed closely adjacent each other and it is particularly important to prevent excessive bowing in order to assure proper reactor operation. At the same time, the closely packed fuel elements leave minimum space for disposition of monitor lines to carry vented gases from the vents 14 to suitable monitor means (not shown).

Accordingly, the present invention also provides a particularly efficient and compact arrangement for interconnecting the diametrically opposed vents of each fuel element 11 with suitable monitor means to permit monitoring of the condition in each fuel element. The manner in which the invention accomplishes this function is described below.

As was indicated above, monitor passages for communication with the respective vents 14 are internally formed within the tri-cusp portions 16 of the grid plate 12. Within the reactor shown in FIG. 1, it may be seen that the grid plate 12 also provides structural support for the fuel elements. However, this is not a critical feature of the invention. In other words, a suitable grid plate forming monitor passages for communication with the vents in the fuel elements could be a separate portion of the reactor core in addition to means (not shown) for supporting the fuel elements within the core.

In any event, the passages 15 formed in the tri-cusp portions of the grid plate communicate each vent 14 with a vertical monitor passage 22. A connector assembly 23 (see FIG. 3) is secured to the grid plate above each tri-cusp portion including a vertical passage 22 to communicate each vertical passage with a monitor line 24 for carrying gases received from the monitor passages 15 to a respective monitoring device. As may be best seen in FIG. 3, each connector assembly 23 includes a hollow male plug 26 which enters into sealed engagement with the respective vertical monitor passage 22. The connector assembly 23 is secured in place upon the grid plate 12 by means of screws 27. An internal cross-drilled passage 28 extends upwardly from the male plug 26 to communicate each vertical monitor passage 22 with the respective monitor line 24.

A plurality of outlet vents connect with each monitor line, the plurality of outlet vents including only one vent for any single fuel element. At the same time, it is essential that there be at least as many different combinations of monitor lines 24 as there are fuel elements in order to permit identification of leaking elements by monitoring radioactivity levels in all of the monitor lines. For example, it may be assumed that a typical reactor core includes two hundred and seventeen fuel elements each having a separate receiving hole 29 in the grid plate 12. Since each fuel element has two outlet vents 14, there is a total of four hundred and thirty four vents. Initially, the two vents for each fuel element must be connected to different monitor lines in order to form a matrix which permits individual monitoring of the separate fuel elements. With the two vents 14 for any given fuel element being connected to two different monitor lines, a high level of activity would be indicated in those two lines if the associated fuel element were to develop a leak. Thus, it is necessary to provide two hundred and seventeen different pairs of lines to separately monitor each fuel element. This is demonstrated by the following theorem of combinations, $$_nC_r = n!/[r!(n-r)!]$$

where

C = number of combinations, pairs, or fuel elements,
n = number of monitor lines,
r = 2 for pairs or two vents per fuel element.

For the case where there are two hundred and seventeen fuel elements each having two vents, C = 217 and r = 2. From the above equation, it is then apparent that n must be greater than 21 and since it must be an integer, a minimum of twenty two monitor lines is required in order to monitor the operating condition of each fuel element.

At the same time, however, it must be kept in mind the very compact arrangement of the fuel element provides limited space for receiving monitor lines to connect with the various vents 14. In order to simplify the arrangement of monitor lines, a selected plurality of vents is interconnected with each monitor line, the plurality of vents repeating geometrically throughout the hexagonal arrangement of fuel elements.

Figure 4:
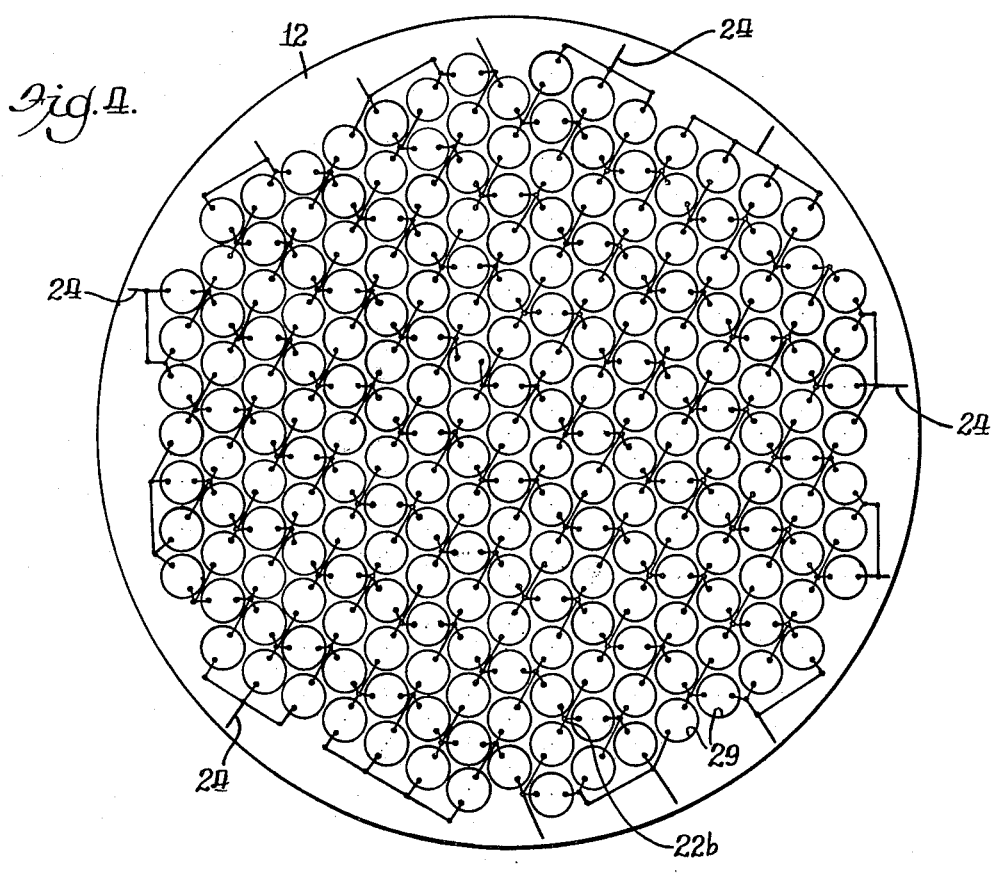
FIG. 4 is a plan view of one embodiment of a grid plate internally forming passages for interconnecting outlet vents of four different fuel elements with each respective monitor line in a geometrically repeating pattern.
Figure 6:
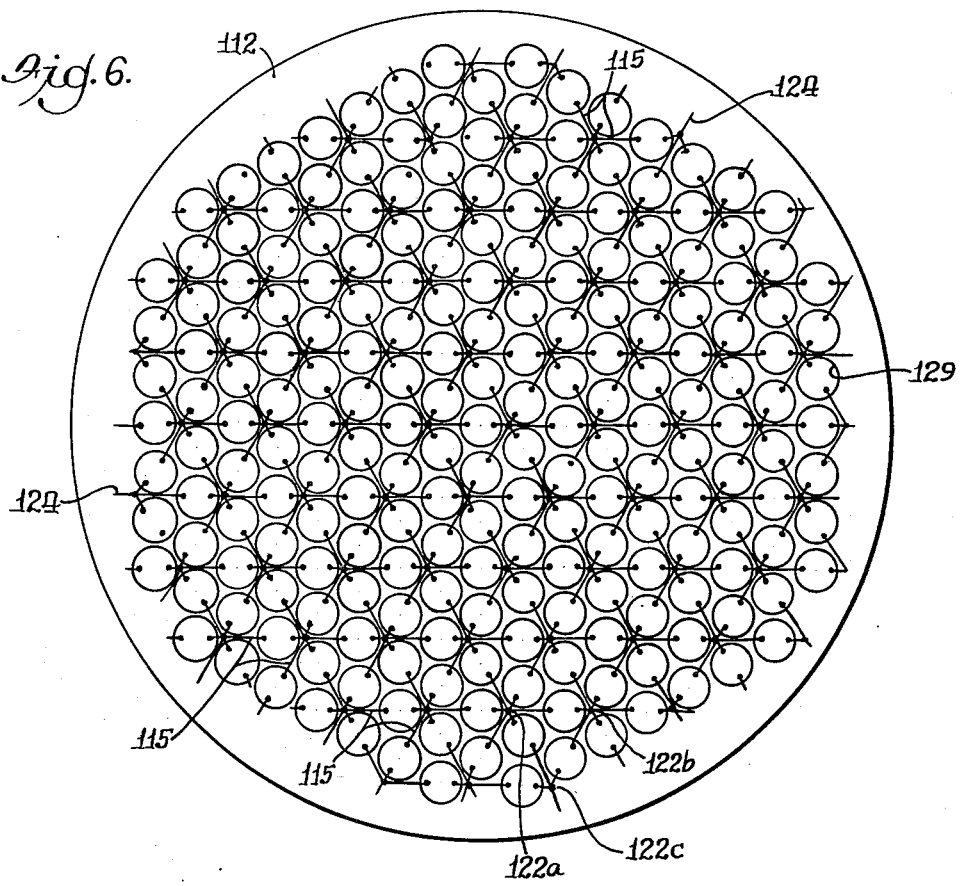
FIG. 6 is similarly a plan view of another embodiment of a grid plate also internally forming passages for interconnecting outlet vents in six different fuel elements with each monitor line.

From a consideration of the hexagonal array generally indicated in FIGS. 4 and 6, it may be seen that combinations which repeat geometrically throughout the array include two, three, four and six. Combinations of two vents interconnected with each monitor line would be of no advantage since this would be equivalent to interconnecting each individual fuel element with a separate monitor line. Accordingly, the invention particularly contemplates a selected plurality of three, four or six vents on different fuel elements being interconnected with each monitor line. The minimum number of monitor lines corresponding to three, four or six vents connected with each monitor line, is 145, 109 and 75 respectively to service a core of 217 fuel elements.

An arrangement of monitor lines is illustrated in FIG. 4 for interconnecting four different vents with each monitor line. FIG. 6 illustrates another arrangement of monitor lines for interconnecting six different vents with each monitor line. The other combination for a plurality of three vents being interconnected with each monitor line could be obtained by modifying the arrangement of FIG. 6 to provide two different monitor lines within each combination of six vents.

Figure 5:
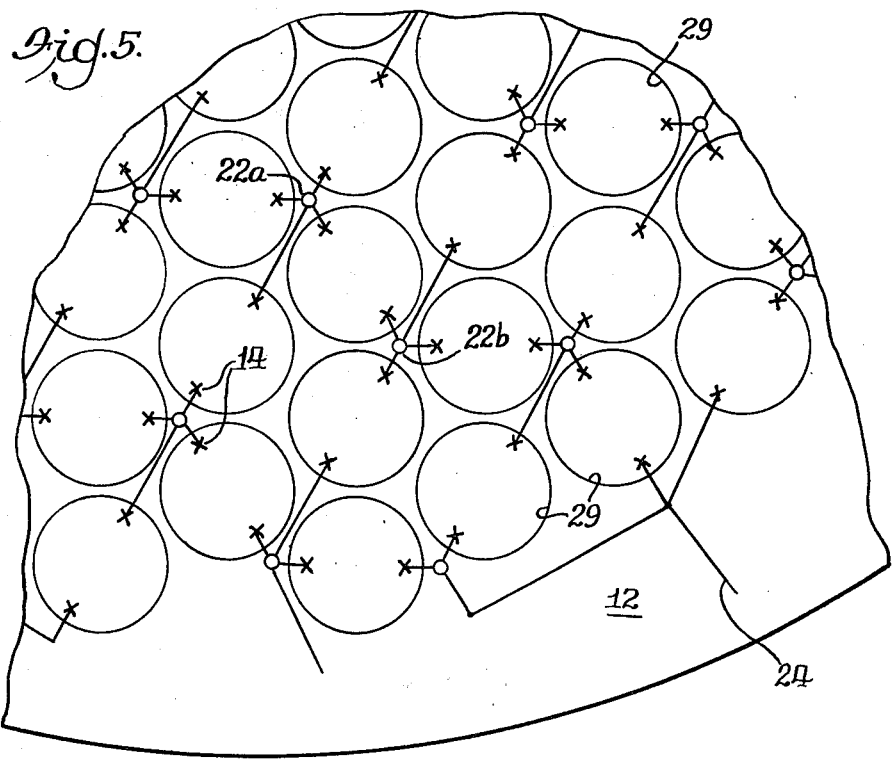
FIG. 5 is an enlarged fragmentary view of a portion of the grid plate of FIG. 4 to better illustrate the manner in which internal passages are formed within the grid plate.

Referring now to FIG. 4, geometrically repeating combinations of four vent connections are connected with each monitor line mounted in a tri-cusp portion of the grid plate. The repeating nature of such a geometric arrangement may be better seen in FIG. 5. For example, one vertical monitor passage is indicated at 22a for connection with four vents in four different fuel elements while a second vertical monitor passage 22b is arranged for communication with four vents in a different set of four fuel elements. Additional vertical monitor passages 22 are formed in the grid plate to provide a repeating pattern of connection for sets of four vents.

The geometric pattern of vent connections can not be continued around the periphery of the grid plate. Accordingly, it is necessary to interconnect adjacent passages in the grid plate so that a minimum number of monitor lines is required. Referring again to FIG. 4, it may be seen that a cross-passage is also formed in the grid plate at 31 to interconnect four different vents with a single monitor line 24a. Additional cross-connections are provided about the periphery of the grid plate to similarly increase efficiency of the interconnection arrangement of FIG. 4. It must be kept in mind that any such additional cross-connections about the periphery of the grid plate must be made with the separate vents of each fuel element being connected to a different monitor line. This condition is of course also necessary for cross-connections referred to below with respect to FIG. 6.

Figure 3:
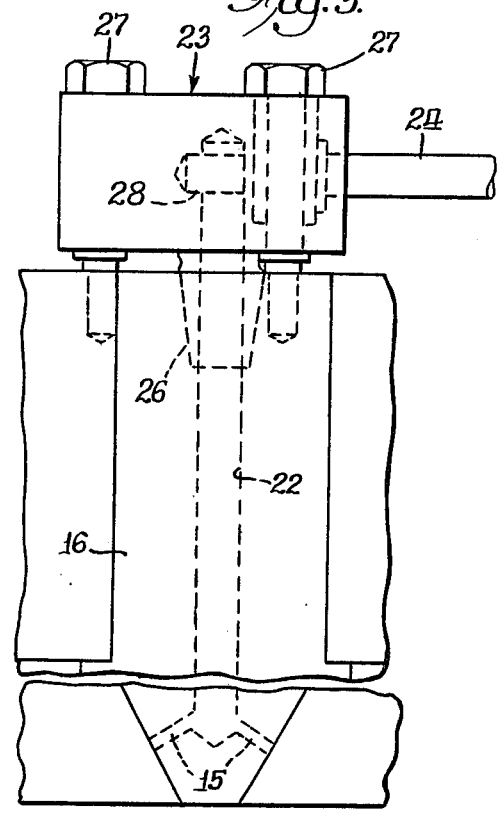
FIG. 3 illustrates a monitor connection for the gas passage in one tri-cusp portion of the grid plate.

Referring to FIG. 6, a geometric arrangement is illustrated for interconnecting six vents 14 in different fuel elements with individual vertical monitor passages and with the separate monitor lines 24 (see FIG. 3). In FIG. 6, the schematic representation of a hexagonal array of holes 29 for receiving individual fuel elements clearly indicates the repeating pattern possible for the two vents in each fuel element of the array. Here again, cross-connections are employed about the periphery of the array to make more efficient use of the monitor lines.

Figure 9:
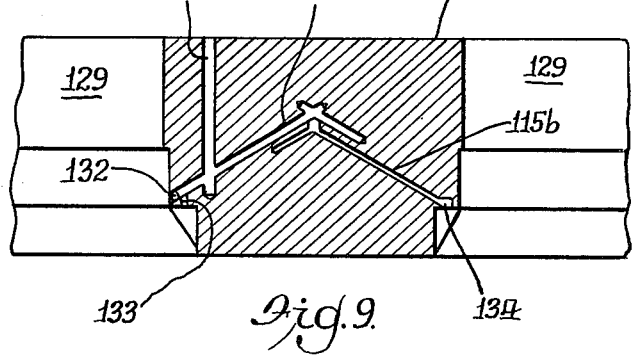
FIG. 9 is a view taken along section line IX—IX of FIG. 7.
Figure 7:
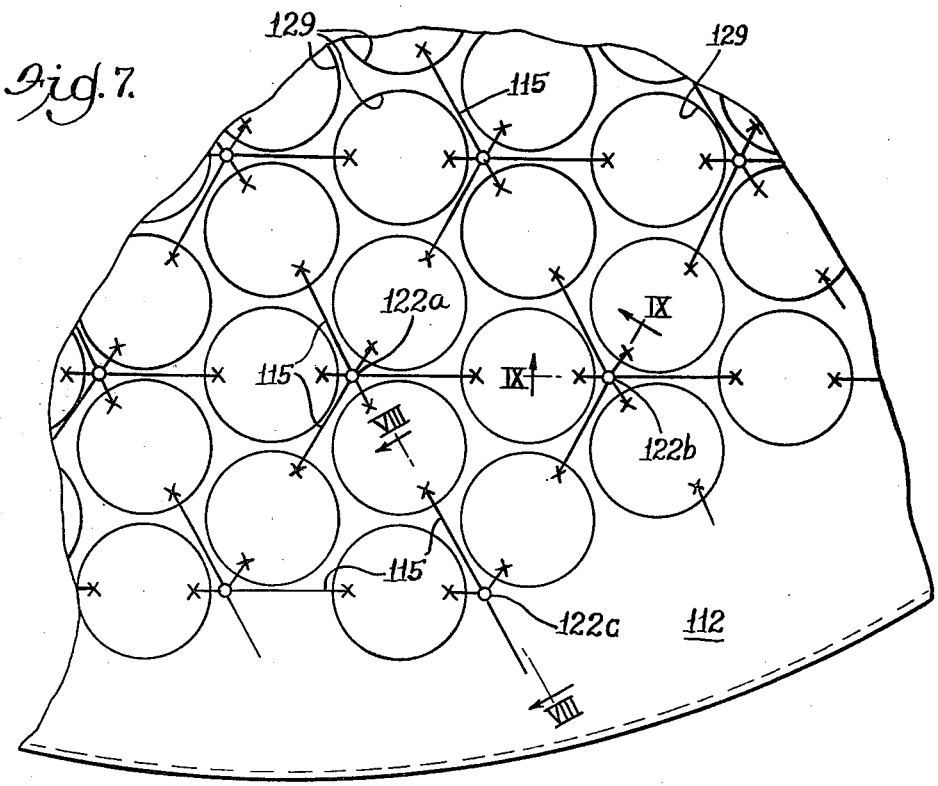
FIG. 7 is an enlarged fragmentary view of a portion of the grid plate of FIG. 6 to better illustrate the manner in which the internal passages are formed.

In the embodiment of FIG. 7, vertical monitor passages are formed at 122a, 122b and 122c. Referring also to FIG. 3, each separate receiving hole 129 within the grid plate 112 is adapted to receive a fuel element each including two diametrically opposed vents. The vents in the fuel elements are interconnected with the vertical monitor passage 122a by means of a plurality of passages 115 which may be best seen in FIG. 9. FIG. 9 illustrates two passages 115 interconnecting vents from two different fuel elements with the vertical monitor passage 122a. Additional passages, similarly formed in the grid plate, provide a simple interconnection for each of six vents with the vertical monitor passage.

FIG. 9 also illustrates two different configurations for the passages 115 to communicate individual vents with the vertical monitor passage 122a. For example, passages 115a may be drilled directly from the vertical side wall of the tri-cusp portion 116. The end of the passages 115a is blocked by means of a plug 132, each passage 115a being placed in communication with one respective vent by means of a small vertical passage 133.

Similarly, passages such as those indicated at 115b could be used. Each of the passages 115b includes a relatively large diameter, short vertical bore 134 formed in each tri-cusp portion of the plate, each passage 115b being drilled directly through a wall portion of the vertical bore. In any event, either of the passages 115a and/or 115b could be used for interconnecting respective vents with the vertical passage 122a.

The vertical monitor passage 122b is generally identical with the vertical monitor passage 122a for providing an interconnection with a different set of six vents. These two vertical monitor passages indicate the repeating geometric arrangement for this pattern throughout the array of fuel elements.

Figure 8:
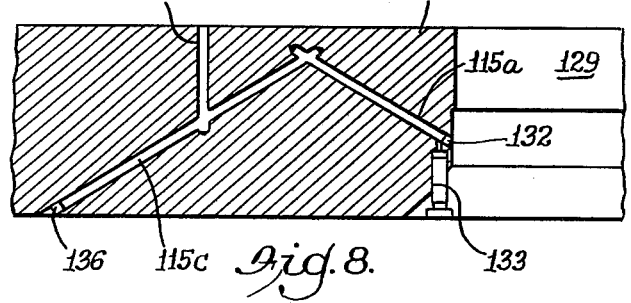
FIG. 8 is a view taken along section line VIII—VIII of FIG. 7.

The vertical monitor passage 122c further illustrates how certain of the vents adjacent the periphery of the fuel element array are interconnected with a suitable number of other vents to permit efficient use of the various monitor lines. Referring also to FIG. 8, a blind passage 115c is drilled (and plugged as indicated at 136) to assure proper communication between the vents 114 and the vertical monitor passages such as that indicated at 122c.

Thus, there has been disclosed a particularly efficient and reliable arrangement of monitoring lines for interconnecting diametrically opposed vents in a compact array of nuclear fuel elements. Many variations and modifications, in addition to those indicated above, are possible within the scope of the present invention. For example, it is again noted that the interconnecting passages may be formed by any plate or grid structure which is in contact with the various fuel elements. As noted above, the grid or plate structure may be a support for the fuel elements placed either in a lower or upper portion of the core. It is not essential that the grid or plate also perform a supporting function for the fuel elements. However, it is important, for each of the embodiments described above, that the vents for any individual fuel element be connected with separate monitor lines. In this regard, it is again noted that the arrangement of interconnecting lines is selected so that a separate pair of lines will always be representative of the condition within each individual fuel element. With the vents of the fuel elements being diametrically opposed, this monitoring function may be performed even if the individual fuel elements are reversed in order to overcome bowing effects as described above for example. Accordingly, the scope of the present invention is defined only by the following appended claims.

What is claimed is:

1. In a core assembly for a nuclear reactor having a plurality of fuel-rod containing fuel elements compactly arranged in a hexagonal array and supported closely adjacent each other during operation of the core, each of the fuel elements including means for admitting coolant gas to an interior portion thereof in order to equalize static pressure across cladding of the fuel rods and permit concomitant venting of fission gases, each of the fuel elements having diametrically opposed vents to facilitate selective rotation of the fuel elements to compensate for bowing due to irradiation, an improved arrangement of interconnecting means for communicating vents on the individual fuel elements with respective monitoring means comprising a grid plate surrounding and engaging each of the fuel elements adjacent the diametrically opposed outlet vents therein, monitoring passages being formed in said grid plate for respective communication with the outlet vents in the individual fuel elements, combinations of said monitoring passages being interconnected with a common monitor passage, means connecting each common monitor passage with a single monitor line, the combination of monitor passages being interconnected with each common monitor passage being selected to permit a uniformly repeating geometric arrangement of monitoring passages throughout the hexagonal array of fuel elements and with the opposed vents of each fuel element being interconnected with different common monitor passages.

2. The monitoring arrangement of claim 1 wherein combinations of three, four or six monitoring passages are predominantly interconnected with each common monitor passage in the grid plate.

3. The monitoring arrangement of claim 1 further comprising metering means for allowing coolant gas circulating about the fuel elements to flow inwardly toward said monitoring passages and said common monitoring passages to assure that fission products internally formed within the fuel elements are not released in the coolant gas circulating about the fuel elements.

4. The monitoring arrangement of claim 1 wherein the grid plate is a support plate providing support for weight of the individual fuel elements, the grid plate being formed with a plurality of holes for receiving the respective fuel elements, each hole being formed with a cylindrically tapered surface mating with a surface portion of the respective fuel elements adjacent the outlet vents, the monitor passages being drilled angularly through tri-cusp portions of the support grid plate, each common monitor passage being drilled vertically through tri-cusp portions of the support grid plate to intersect and communicate with the respective combination of monitor passages.

5. The monitoring arrangement of claim 4 further comprising a connector assembly secured to a respective tri-cusp portion of the support grid plate containing a common monitor passage, said connector assembly including passage means for providing sealed interconnection between the common monitor passage and a monitor line external of the support grid plate.

6. The monitoring arrangement of claim 1 wherein the nuclear reactor is a gas-cooled fast reactor.

* * * * *